United States Patent [19]

Ness

[11] Patent Number: 5,319,162
[45] Date of Patent: Jun. 7, 1994

[54] MEANS FOR MEASURING CONTAINER CONTENTS

[76] Inventor: Irving S. Ness, 46A Wiggins St., Princeton, N.J. 08540

[21] Appl. No.: 109,344

[22] Filed: Aug. 20, 1993

Related U.S. Application Data

[63] Continuation-in-part of Ser. No. 970,057, Nov. 2, 1992.

[51] Int. Cl.⁵ .................... G01G 3/00; G01G 21/28; G01G 19/56; G01L 1/04
[52] U.S. Cl. ..................................... 177/231; 177/148; 73/862.621
[58] Field of Search ............... 177/132, 225, 148, 231; 73/862.621

[56] References Cited

U.S. PATENT DOCUMENTS

| | | | |
|---|---|---|---|
| 3,487,886 | 1/1970 | Sunnen | 177/132 |
| 4,053,024 | 10/1977 | Hoyt | 177/225 |
| 4,413,515 | 11/1983 | Quinn | 177/225 X |

FOREIGN PATENT DOCUMENTS 2721518  2/1978  Fed. Rep. of Germany ...... 177/225

Primary Examiner—George H. Miller, Jr.
Attorney, Agent, or Firm—Robert L. Minier

[57] ABSTRACT

An improved container which includes means for measuring the amount of material in the container.

7 Claims, 3 Drawing Sheets

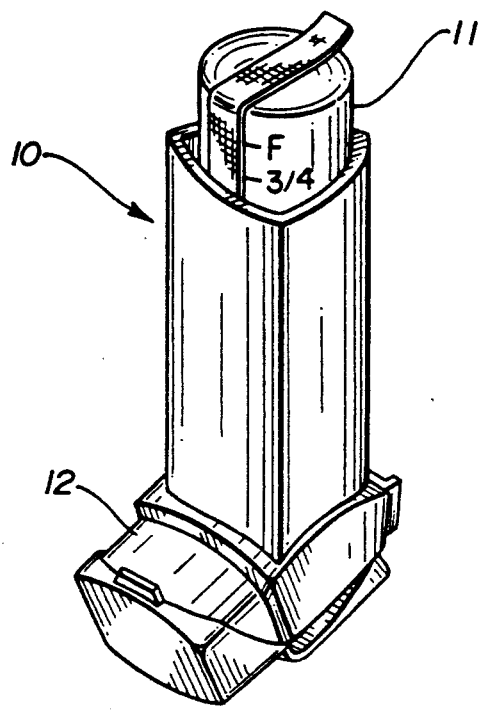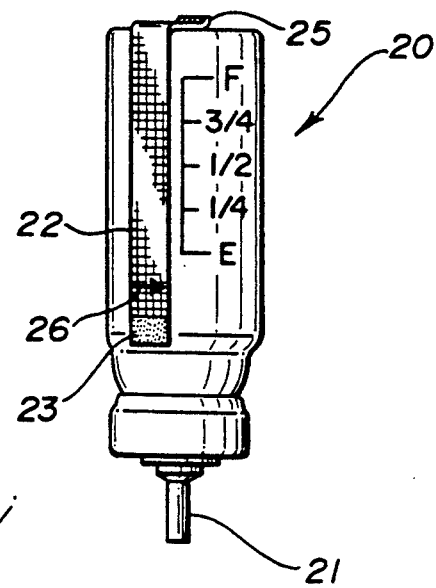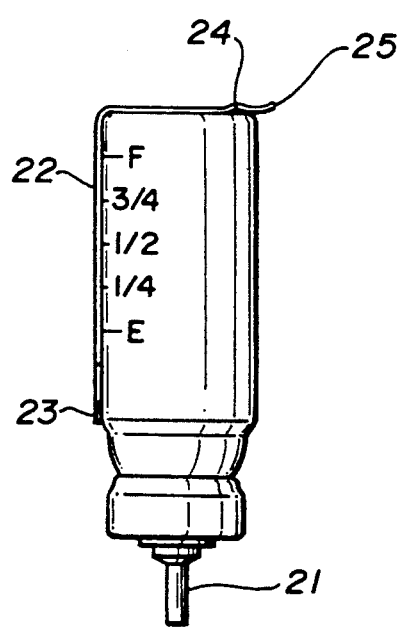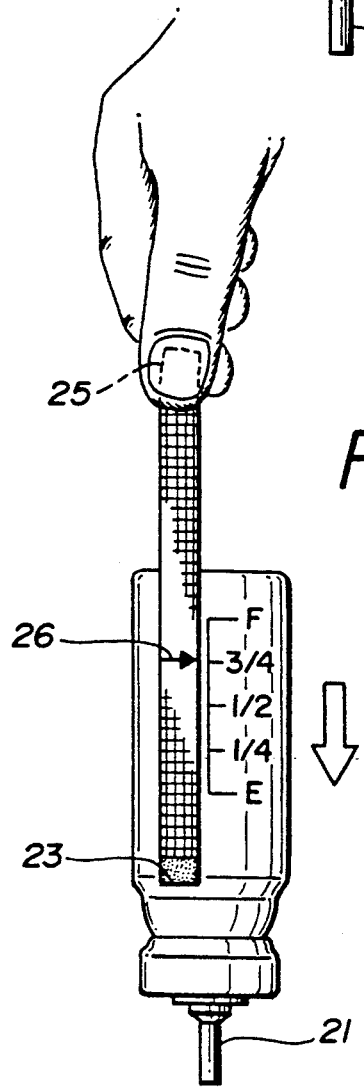
FIG-1
FIG-2
FIG-3
FIG-4

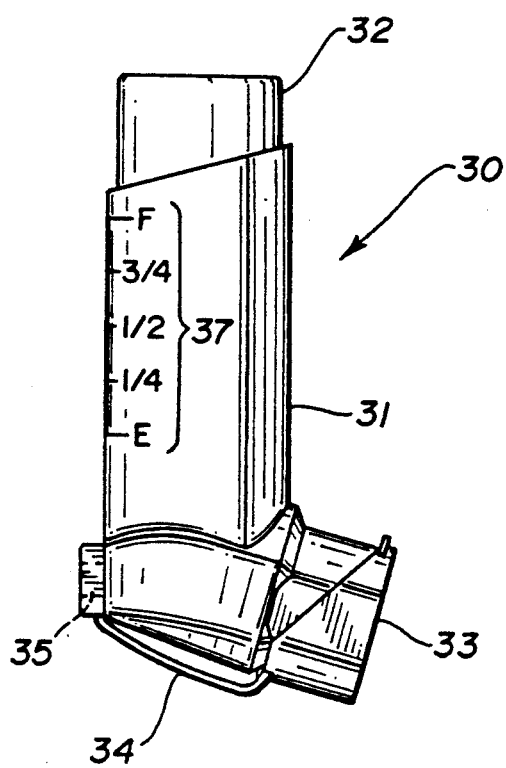
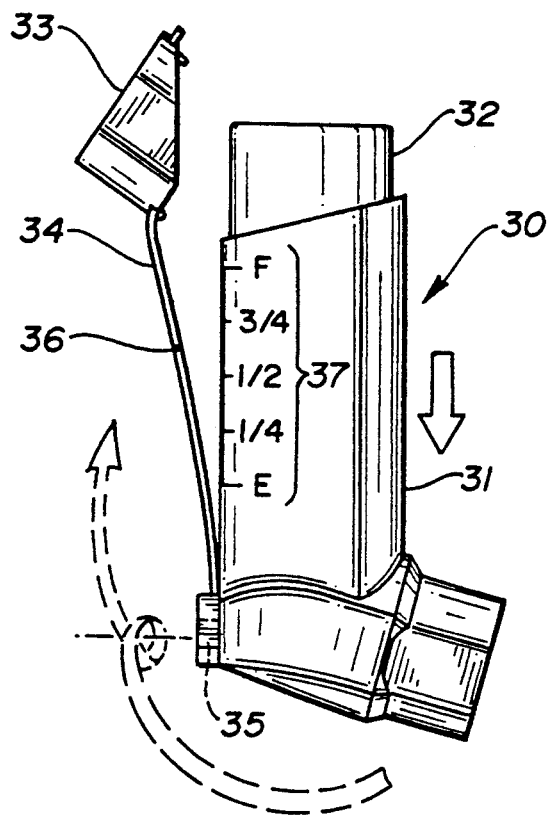
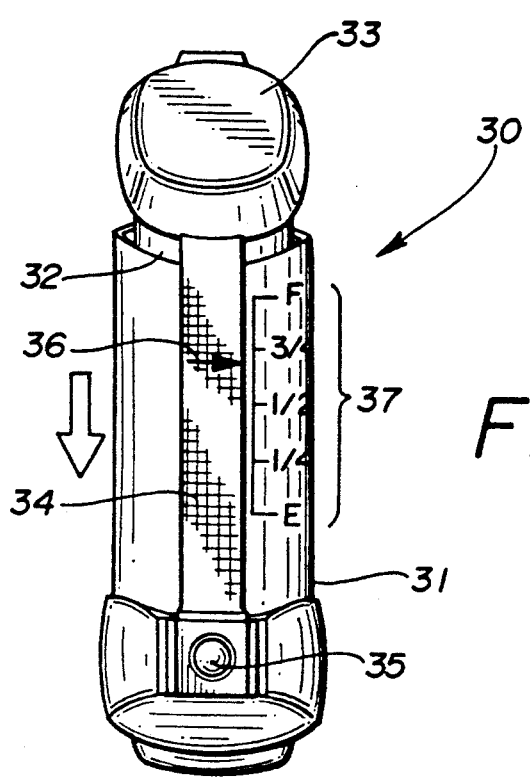

MEANS FOR MEASURING CONTAINER CONTENTS

RELATED PATENT APPLICATIONS

This is a continuation-in-part patent application of co-pending patent application Ser. No. 07/970057 filed Nov. 2, 1992.

FIELD OF INVENTION

The present invention relates to means for determining the amount of material in a container wherein the material cannot be seen inside the container.

BACKGROUND OF THE INVENTION

Many products are sold in containers in which the material inside the container cannot be seen. Such products are often dispensed from the containers periodically and, hence, the user is never sure how much material is left in the container. One such product is an inhaler used by asthma sufferers. This product comprises an inhaler in which there is placed a container containing a prescription drug. The user inhales from this product usually a couple of times a day. It is important for the user to know how much material remains in the canister or container he is using with his inhaler. There are a number of reasons for this. The costs of throwing away a container that has not been emptied is one consideration, but also the inhaler, at critical times, may find he has unknowingly used all the material there was in the container. There are techniques for determining the amount of material contained in these containers, such as seeing how they float or submerge in a body of water or, in fact, weighing them. As can be appreciated, such techniques are cumbersome and not always available to the user at the critical time.

It is an object of the present invention to provide a simple means for being able to determine, at least in general, the amount of material in such a container. It is yet a further object of the present invention to provide a means to measure the material in the container in a simple and convenient manner.

SUMMARY OF THE PRESENT INVENTION

The present invention is a container which includes means for measuring the amount of material in the container. The container may be square, cylindrical, octagonal, etc. In any event the container will have a top and a bottom and at least one side to connect the top and the bottom. Attached to the side of the member is an elastic member. The elastic member has one of its ends attached to the side of the container generally near the top or bottom of the container. The other end is free to be grasped by the user. The elastic member includes a first indicating means disposed on its surface. There is a second indicating means disposed on the side of the container. The two means are linerally related to each other so that if the unattached end of the elastic member is grasped by the user and the container allowed to hang freely from that elastic member, the indicating means will align with each other to indicate the amount of material present in the container. In certain embodiments of the present invention the second indicating means may be removably attached to the container so that the second indicating means may be used with more than one container. When a removable indicating means is used there should be appropriate means on the container and the indicating means to insure proper alignment between the two in order to obtain accurate readings with a plurality of containers.

BRIEF DESCRIPTION OF THE DRAWINGS

FIG. 1 is a perspective view of an inhalator in which a container has been inserted;

FIG. 2 is a front view of the container of FIG. 1;

FIG. 3 is a side view of a container depicted in FIG. 2;

FIG. 4 is a front view similar to FIG. 2 showing the method of measuring the amount of material in the container;

FIG. 5 is a side view of another embodiment of a container of the present invention;

FIG. 6 is a side view of the container of FIG. 5 with the measuring means extended; and FIG. 7 is a rear view of the container shown in FIG. 6.

DETAILED DESCRIPTION OF THE DRAWINGS

Figure 8:
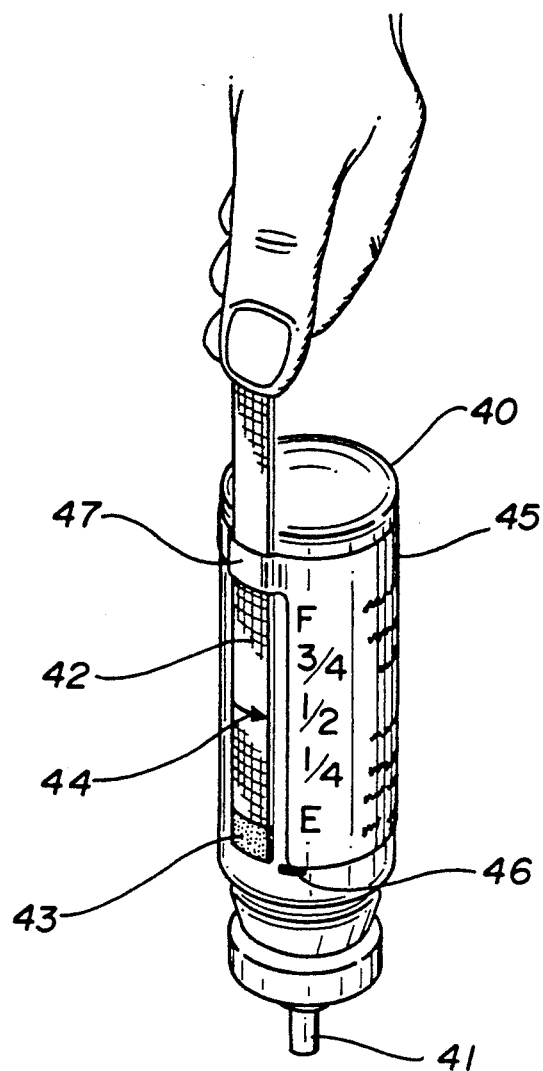
FIG. 8 is a front view similar to FIG. 4 showing another embodiment of the measuring means of the present invention.

Referring to the Figures, in FIG. 1, there is shown an inhaler 10 used by asthmas sufferers. The inhaler comprises a compartment for holding a container 11 or canister of the appropriate pharmaceutical composition. The inhaler has a mouth piece portion 12. In use, the mouth piece is removed. The user places that end of the inhaler in his mouth and activates a spray of the pharmaceutical composition from the container by pressing down on the container. The user can do this a number of times until the container is empty. As previously mentioned, the problem is that it is very difficult for the user to determine when the container is empty or nearly empty or still relatively full. The present invention solves that problem in a very simple and economical manner.

Referring to FIG. 2 there is shown a container 20 for use with an inhaler. The container is cylindrical in shape though it can be square, rectangular, octagonal or other shape as desired. At one end of the container is an appropriate sprout or nozzle valve 21 which, when pushed inwardly, disposes a spray of the desired pharmaceutical composition.

Attached to the side of the container, close to the bottom, is an elastic member 22. One end of the elastic member is adhered by adhesive means 23 to the side of the container. As seen in FIG. 3, the opposite end of the elastic member is detachably adhered 24 to the container and provides a grasping end 25. The elastic member includes an indicator 26 such as an arrow on its surface. On the side of the container is an appropriate scale. In this embodiment, the scale shown the container has the markings "E for empty, $\frac{1}{4}$/, $\frac{1}{2}$, $\frac{3}{4}$ and F for full".

As seen in FIG. 4, it is a simple matter to grasp the elastic member and detach it from the container allowing the container to hang freely from the elastic member. The weight of the container will displace the container so that the indicator on the elastic member will align with the scale on the container and show the appropriate amount left in the container. In FIG. 4 it is shown that the container remains half full. It is a simple matter to coordinate the degree of elasticity in the elastic member to the weight of the contents of the container and to set the appropriate spacing of the scale on the container. The elastic member may be an elastic film or elastic thread or other materials that have elasticity.

In grasping the detachable end of the elastic member and allowing the container to hang freely from the elastic member, it may be that the container displaces itself from a completely vertical position. It is a simple matter for the person doing the measuring to gently move the container back into the vertical position so that a relatively accurate reading of material left in the container may be obtained. If desired a hook-like extension may be placed on the container to engage the elastic member and assist in the alignment of the elastic member with the container.

Many of the pharmaceutical companies recommend, when the container is ¼ full, the user either replace the container or see the doctor. It would be a simple matter to place a red line at the ¼ full mark to alert the user that the container should be replenished or they should see their doctor.

Referring to FIGS. 5, 6, and 7, there is shown another embodiment of a container according to the present invention. In this embodiment, the container 30 comprises both the inhaler 31 and the canister 32 containing the pharmaceutical composition to be dispensed. The container includes a detachable mouthpiece cover 33. The cover is attached to the inhaler by a strap 34. One end of the strap is attached to the mouthpiece cover and the opposite end pressed over a raised tang 35 on the side of the container. When the cover is removed, it may be pivoted around the raised tang as shown in FIGS. 6 and 7. The strap, or at least a portion of the strap, is elastic. The strap also includes indicating means such as the arrow 36 shown in FIG. 6. The side of the inhaler includes corresponding indicating means such as the scale 37 shown in FIGS. 6 and 7. The amount of material in the canister may be readily determined by removing the mouthpiece cover and placing it in the position shown in FIG. 7. The cover then may be grasped so the inhaler and canister hang free. The indicating means on the strap and the scale on the inhaler will align themselves to provide a reading of the amount of material remaining in the canister.

Figure 9:
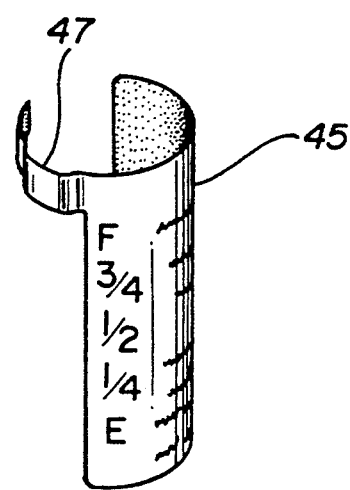
FIG. 9 is a front view of a removably attachable second indicating means.

In FIG. 8, there is shown another embodiment of the measuring means of the present invention. In this embodiment, the container 40 is cylindrical and includes a nozzle value 41 at one end thereof. Attached to the side of the container is an elastic measuring member 42. The member is attached to the container at the end of the container containing the nozzle values by a suitable adhesive 43. The elastic member includes an indicator 44. A second indicating means 45, as shown in FIG. 9, is removably attached to the container. The second indicating means is made of resilient material that it may be placed over the container, as shown in FIG. 8. The inside surface of the second indicating means has adhesive thereon to insure desired attachment to the container. A lip 46 on the container insures the desired placement of the second indicating means on the container. The second indicating means includes an appropriate scale, as shown. Also disposed at the top portion of the second indicating means is an expanded area 47. This expanded area fits over the elastic measuring member to allow movement of the elastic member and also assist in maintaining alignment between the elastic member and the container to allow for accurate measurements.

Although I have described the present invention in conjunction with a container containing a pharmaceutical composition for use with an asthma inhaler, it, of course, could be applied to other containers or canisters. It could be used with virtually any container or canister wherein the contents cannot be viewed but can be measured by their weight. An example would be material which is topically applied from a container as long as the container itself substantially maintains its shape throughout its use.

Having now described the present invention and specific embodiments thereof, it will be appreciated by those skilled in the art that many modifications and variations may be made from the present invention without departing from the spirit or scope thereof.

What is claimed is:

1. A container including means for measuring the amount of material in said container, said container having a top, a bottom, and a side connecting said top and bottom, said means for measuring comprising an elastic member having one end thereof attached to the side of said container and having the other end thereof detachable from said container, means disposed on said container for maintaining said elastic member adjacent said container, a first indicating means disposed on said elastic member and a second indicating means disposed on said side whereby when the said detachable end is grasped and said container allowed to be held by said elastic member attached to said side, said elastic member stretches to align said first and second indicating means to indicate the amount of material in the container.

2. A container according to claim 1 wherein the container has a cylindrical shape.

3. A container according to claim 1 wherein the elastic member is an elastic film.

4. A container according to claim 1 wherein the first indicating means disposed on said elastic member is a single mark and the second indicating means disposed on said side is a scale.

5. A container according to claim 4 wherein the container has a cylindrical shape and the elastic member is an elastic film.

6. A container according to claim 1 wherein the second indicating means is removably attached to said container.

7. A container according to claim 6 wherein the second indicating means includes means for maintaining said elastic member adjacent said container.

* * * * *